(12) United States Patent
West et al.

(10) Patent No.: US 7,518,335 B2
(45) Date of Patent: Apr. 14, 2009

(54) METHOD AND APPARATUS FOR PWM CONTROL OF VOLTAGE SOURCE INVERTER TO MINIMIZE CURRENT SAMPLING ERRORS IN ELECTRIC DRIVES

(75) Inventors: Stephen T. West, New Palestine, IN (US); Brian Welchko, Torrance, CA (US); Steven E. Schulz, Torrance, CA (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 244 days.

(21) Appl. No.: 11/462,454

(22) Filed: Aug. 4, 2006

(65) Prior Publication Data

US 2008/0094023 A1 Apr. 24, 2008

(51) Int. Cl.
*H02P 27/08* (2006.01)

(52) U.S. Cl. ............... 318/811; 318/810; 327/170; 327/175

(58) Field of Classification Search ........... 318/811, 318/807, 696, 810; 327/172, 175
See application file for complete search history.

(56) References Cited

U.S. PATENT DOCUMENTS

| 5,657,216 | A | * | 8/1997 | Kaura | ........... | 363/41 |
| 5,706,186 | A | * | 1/1998 | Blasko | ........... | 363/41 |
| 5,811,949 | A | * | 9/1998 | Garces | ........... | 318/448 |
| 5,850,132 | A | * | 12/1998 | Garces | ........... | 318/599 |
| 6,023,417 | A | * | 2/2000 | Hava et al. | ........... | 363/41 |
| 2007/0268051 | A1 | * | 11/2007 | Kerkman et al. | ........... | 327/175 |

* cited by examiner

*Primary Examiner*—Bentsu Ro
*Assistant Examiner*—David S Luo

(57) ABSTRACT

A method for controlling an alternating current (AC) motor includes choosing a pulse sequence based on a ripple current in the AC motor at a sampling instant; and providing a voltage to the AC motor based on the pulse sequence.

20 Claims, 6 Drawing Sheets

FIG. 4 — V₀ CENTER ACTIVE

FIG. 5 — V₇ CENTER NULL

FIG. 6 — V₀ CENTER NULL

FIG. 7 — V₇ CENTER ACTIVE

FIG. 8 — V₀ CENTER ACTIVE

FIG. 9 — V₇ CENTER NULL

FIG. 10 — V₀ CENTER NULL

FIG. 11 — V₇ CENTER ACTIVE $V_0$ CENTER ACTIVE $V_7$ CENTER NULL $V_0$ CENTER NULL $V_7$ CENTER ACTIVE $V_0$ CENTER ACTIVE $V_7$ CENTER NULL $V_0$ CENTER NULL $V_7$ CENTER ACTIVE

FIG. 20 — $V_0$ CENTER ACTIVE

FIG. 21 — $V_7$ CENTER NULL

FIG. 22 — $V_0$ CENTER NULL

FIG. 23 — $V_7$ CENTER ACTIVE

FIG. 24 — $V_0$ CENTER ACTIVE

FIG. 25 — $V_7$ CENTER NULL

FIG. 26 — $V_0$ CENTER NULL

FIG. 27 — $V_7$ CENTER ACTIVE

| SECTOR | V₀ CAV SEQUENCE | V₇ CNV SEQUENCE | V₀ CNV SEQUENCE | V₇ CAV SEQUENCE |
|---|---|---|---|---|
| ONE | 0-1-2-2-1-0 | 1-2-7-7-2-1 | 2-1-0-0-1-2 | 7-2-1-1-2-7 |
| TWO | 0-3-2-2-3-0 | 3-2-7-7-2-3 | 2-3-0-0-3-2 | 7-2-3-3-2-7 |
| THREE | 0-3-4-4-3-0 | 3-4-7-7-4-3 | 4-3-0-0-3-4 | 7-4-3-3-4-7 |
| FOUR | 0-5-4-4-5-0 | 5-4-7-7-4-5 | 4-5-0-0-5-4 | 7-4-5-5-4-7 |
| FIVE | 0-5-6-6-5-0 | 5-6-7-7-6-5 | 6-5-0-0-5-6 | 7-6-5-5-6-7 |
| SIX | 0-1-6-6-1-0 | 1-6-7-7-6-1 | 6-1-0-0-1-6 | 7-6-1-1-6-7 |
FIG. 28
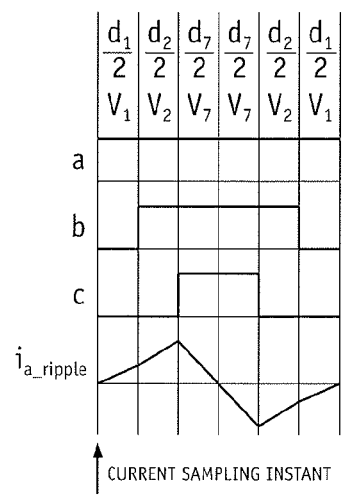
FIG. 29
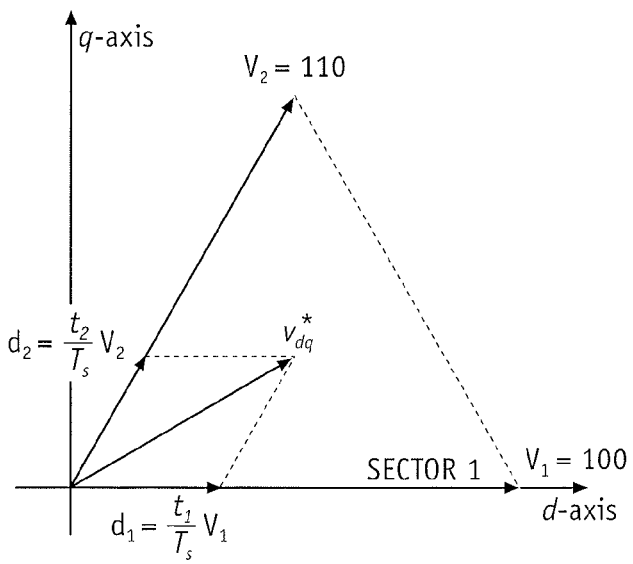
FIG. 30

METHOD AND APPARATUS FOR PWM CONTROL OF VOLTAGE SOURCE INVERTER TO MINIMIZE CURRENT SAMPLING ERRORS IN ELECTRIC DRIVES

TECHNICAL FIELD

The present invention generally relates to a voltage source inverter system, and more particularly relates to an apparatus and method for controlling the output voltage component of a voltage source inverter system such that current sampling errors are minimized.

BACKGROUND OF THE INVENTION

AC motors are used in a variety of applications, including vehicle applications such as traction control. The AC motors used in vehicle applications are typically controlled via a voltage source inverter system. Discontinuous Pulse Width Modulation (DPWM) methods are commonly employed in the controllers of voltage source inverter systems to control the fundamental output voltage component of three phase voltage source inverters of the system. These three-phase voltage source inverters may in turn be used to control the phase currents of three phase AC motors. DPWM methods reduce inverter losses in comparison with continuous Pulse Width Modulation (PWM) methods, such as sinusoidal or space vector modulation.

DPWM methods generally differ from continuous PWM methods in that DPWM methods use a single zero vector in a given switching cycle of the three phase voltage source inverter. Additionally, in most DPWM methods, each switch in the three phase voltage source inverter is not switched, or clamped, for sixty degree (60°) segments of an electrical cycle. The location of the sixty degree (60°) clamped segment with respect to the output voltage of the three phase voltage source inverter and the load power factor generally determines the type of DPWM method and resulting PWM properties.

AC motor drives use a measured current at a given sampling instant as a control variable. However, most PWM techniques add a ripple current onto the motor currents that can cause errors in the sampling instant of the motor drive and result in a malfunction or inefficient operation of the AC motor.

Accordingly, it is desirable to provide a method and apparatus for controlling a voltage source inverter system that minimizes current sampling errors in AC motor drives. Additionally, it is desirable to provide a voltage source inventor system for controlling an AC motor that minimizes current sampling errors. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In an exemplary embodiment, a method for controlling an alternating current (AC) motor includes choosing a pulse sequence based on a ripple current in the AC motor at a sampling instant, and providing a voltage to the AC motor based on the pulse sequence.

In another exemplary embodiment, a voltage source inverter system is provided for controlling an AC motor. The voltage source inverter system includes a controller having an input and an output, and a switch network having an input coupled to said output of said controller and having an output configured to couple to the AC motor. The controller provides a signal to the switch network to produce a pulse sequence to the AC motor. The controller is configured to choose the pulse sequence based on a ripple current in the AC motor at a sampling instant.

DESCRIPTION OF THE DRAWINGS

The present invention will hereinafter be described in conjunction with the following drawing figures, wherein like numerals denote like elements.

FIGS. 4-7 are examples of pulse sequencing methods for the first sector of the space vector diagram of FIG. 3;

FIGS. 8-11 are examples of pulse sequencing methods for the second sector of the space vector diagram of FIG. 3;

FIGS. 20-23 are examples of pulse sequencing methods for the fifth sector of the space vector diagram of FIG. 3;

FIGS. 24-27 are examples of pulse sequencing methods for the sixth sector of the space vector diagram of FIG. 3;

FIG. 28 is a summary table for the pulse sequencing methods shown in FIGS. 4-27;

FIG. 29 is a representative sample of current ripple throughout a switching period within sector one of the space vector diagram of FIG. 3;

FIG. 30 is a graphical representation of the determination of the duty cycles for a portion of the space vector diagram of FIG. 3.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
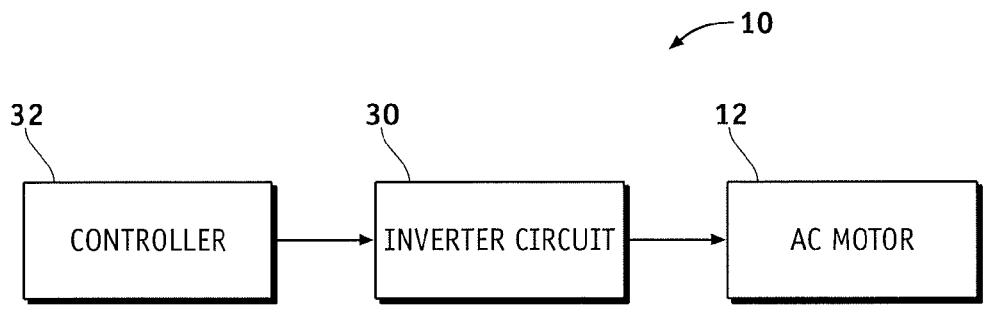
FIG. 1 is a block diagram of a voltage source inverter system in accordance with an exemplary embodiment of the present invention.

Referring to FIG. 1, a voltage source inverter system 10 is shown in accordance with an exemplary embodiment of the present invention. The voltage source inverter system 10 comprises a controller 32, an inverter circuit 30 coupled to an output of the controller 32, and an alternating current (AC) motor 12 coupled to a first output of the inverter circuit 30. Generally, the controller 32 produces a Pulse Width Modulation (PWM) signal for controlling the switching action of the inverter circuit 30, although the controller can also receive the PWM signal from another source, for example, a modulator. In an exemplary embodiment, the controller 32 produces a discontinuous PWM (DPWM) signal having a single zero vector associated with each switching cycle of the inverter circuit 30. The inverter circuit 30 then converts the PWM signal to a modulated voltage waveform for operating the AC motor 12. The AC motor 12 can be a sinusoidally-wound AC motor (e.g., permanent magnet or induction) such as commonly used in automotive vehicles.

Figure 2:
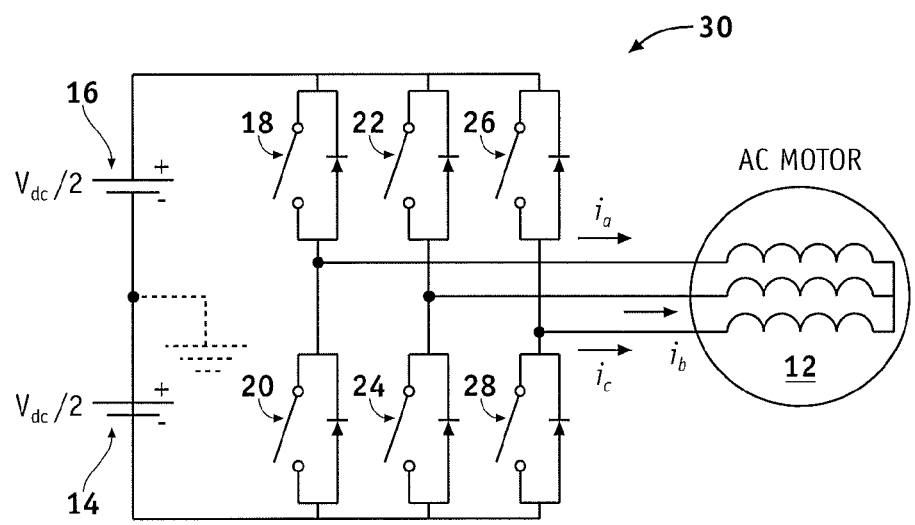
FIG. 2 is a schematic diagram of an inverter circuit of the voltage source inverter system shown in FIG. 1.

FIG. 2 is the inverter circuit 30 of FIG. 1 in greater detail. The inverter circuit 30 is a three-phase circuit coupled to the AC motor 12. More specifically, the inverter circuit 30 comprises voltage sources 14, 16 and a switch network having a first input coupled to the voltage sources 14, 16 and an output configured to couple to the AC motor 12. Although voltage sources 14, 16 are shown as a distributed DC link with two series sources, a single voltage source may be used.

The switch network comprises three pairs of series switches with antiparallel diodes (i.e., antiparallel to each switch) corresponding to each of the phases. Each of the pairs of series switches comprises a first switch 18, 22, 26 having a first terminal coupled to a positive electrode of the voltage source 14, 16 and a second switch 20, 24, 28 having a second terminal coupled to a negative electrode of the voltage source 14, 16 and having a first terminal coupled to a second terminal of the first switch 18, 22, 26, respectively.

Figure 3:
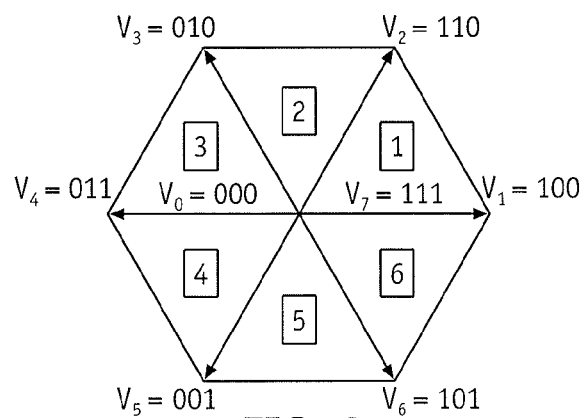
FIG. 3 is a space vector diagram useful for understanding the voltage source inverter system of FIG. 1.
Figure 12:
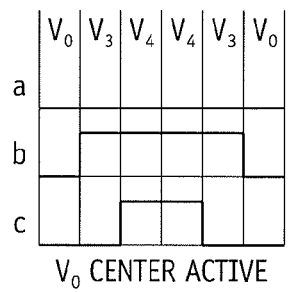
FIGS. 12-15 are examples of pulse sequencing methods for the third sector of the space vector diagram of FIG. 3.
Figure 13:
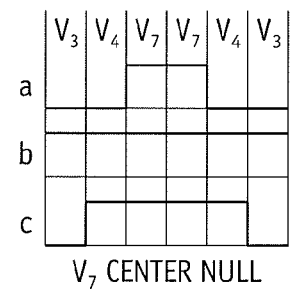
Figure 14:
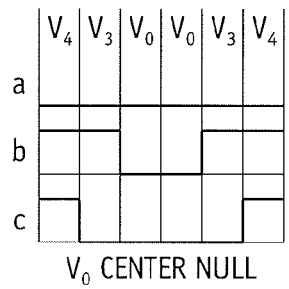
Figure 15:
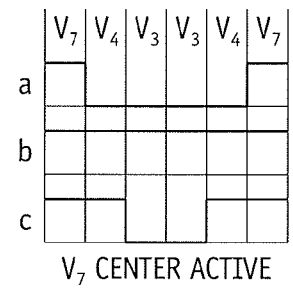
Figure 16:
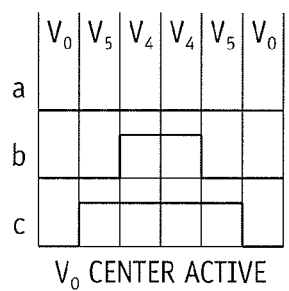
FIGS. 16-19 are examples of pulse sequencing methods for the fourth sector of the space vector diagram of FIG. 3.
Figure 17:
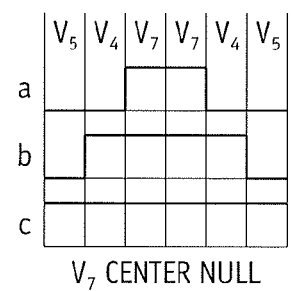
Figure 18:
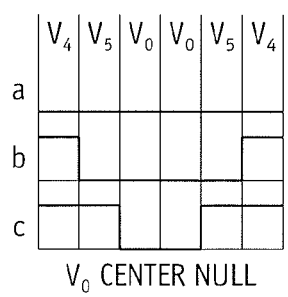
Figure 19:
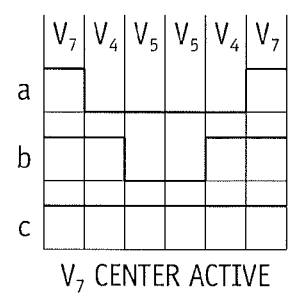

FIG. 3 is a space vector diagram useful for understanding the voltage source inverter system of FIG. 1. The inverter output voltages are represented by vectors (e.g., $V_1, V_2, V_3, V_4, V_5,$ and $V_6$) corresponding to the switching for each phase (e.g., each of three phases) of the switching cycle. Each of the phases has two (2) states (e.g., corresponding to discrete one and zero). For example, $V_1$ is the voltage vector corresponding to a discrete one state (upper switch on, lower switch off) of the first pair of switches 18, 20, and a discrete zero state (upper switch off, lower switch on) of each of the second and third pairs of switches 22, 24 and 26, 28. $V_2$ is the voltage vector corresponding to a discrete one state of each of the first and second pairs of switches 18, 20 and 22, 24, and a discrete zero state of the third pairs of switches 26, 28. $V_3$ is the voltage vector corresponding to a discrete zero state of each of the first and third pairs of switches 18, 20 and 26, 28, and a discrete one state of the second pair of switches 22, 24. $V_4$ is the voltage vector corresponding to a discrete zero state of the first pair of switches 18, 20, and a discrete one state of each of the second and third pairs of switches 22, 24 and 26, 28. $V_5$ is the voltage vector corresponding to a discrete zero state of each of the first and second pairs of switches 22, 24, and 26, 28, and a discrete one state of the third pair of switches. $V_6$ is the voltage vector corresponding to a discrete one state of each of the first and third pairs of switches 18, 20 and 26, 28, and a discrete zero state of the second pair of switches 22, 24. A zero or "null" vector (e.g., at the center of the graphs) corresponds to either a discrete one state for each of the pairs of switches 18, 20, 22, 24, and 26, 28 or a discrete zero state for each of the pairs of switches 18, 20, 22, 24, and 26, 28.

The space vector diagram is further divided into six sectors, as represented by the numbers within the squares. Sector one is bounded by the $V_1$ vector and the $V_2$ vector. Sector two is bounded by the $V_2$ vector and the $V_3$ vector. Sector three is bounded by the $V_3$ vector and the $V_4$ vector. Sector four is bounded by the $V_4$ vector and the $V_5$ vector. Sector five is bounded by the $V_5$ vector and the $V_6$ vector. Sector six is bounded by the $V_6$ vector and the $V_1$ vector. The six sectors correspond to a fundamental cycle of the inverter circuit and map the available output voltage as a function of position. The space vector diagram is useful to represent the macroscopic phase leg duty cycles of the respective PWM method. However, it may not convey information regarding how the respective duty cycles should actually be implemented within a given PWM cycle.

Once the duty cycles of the active and null space vectors are determined, the sequencing within each PWM cycle can be accomplished. Although numerous sequences are possible, an exemplary embodiment of the present invention utilizes one of four possible sequences within each PWM cycle. The four possible sequences are determined based on the three following considerations: 1) only one switch is switched at a time; 2) the sequence is symmetrical with respect to the beginning and end; and 3) one of the switches is not switched during the cycle.

FIGS. 4-7 illustrate the four exemplary pulse sequencing methods for sector one. Particularly, FIG. 4 shows the exemplary pulse sequencing method for the $V_0$ center active vector sequence for sector one, which includes the vector sequence 0-1-2-2-1-0. FIG. 5 shows an exemplary pulse sequencing method for the $V_7$ center null vector sequence for sector one, which includes the vector sequence 1-2-7-7-2-1. FIG. 6 shows an exemplary pulse sequencing method for the $V_0$ center null vector sequence for sector one, which includes the vector sequence 2-1-0-0-1-2. FIG. 7 shows an exemplary pulse sequencing method for the $V_7$ center active vector sequence for sector one, which includes the vector sequence 7-2-1-1-2-7. As indicated by the label, the $V_0$ center active sequence in FIG. 4 utilizes the $V_0$ null vector, active vectors in the center portion of the sequence, and null vectors are on each end. Conversely, the label for the $V_7$ center null sequence in FIG. 5 indicates that the sequence utilizes the $V_7$ null vector and two null vectors in the center portion of the sequence. Generally, the center active vector sequences and the center null vector sequences can be referred to as the CAV and CNV sequences, respectively.

FIGS. 8-27 illustrate the exemplary pulse sequencing methods for sectors two through six, respectively. As in FIGS. 4-7, these sequences are labeled according to whether the null vector is $V_0$ or $V_7$ and whether the sequence has null vectors in the center portion of the sequence or active vectors in the center portion of the sequence. FIG. 28 is a table summarizing the four pulse sequencing methods for each sector.

The pulse sequences provided by the inverter circuit apply the average commanded output voltage to the load over the switching period. Since the switching period is chosen to be much smaller than the time constant of the load, the load essentially acts as a low pass filter and is exposed to a substantially DC term with a superimposed AC component. This AC component induces a high frequency ripple current onto the motor currents. FIG. 29 is an exemplary representation of the ripple current throughout the switching period. As shown in FIG. 29, the induced ripple current has an instantaneous value of zero at the beginning, middle and end of each pulse period as a result of the symmetrical nature of the pulse sequences. For high performance current control, the currents will be at their average commanded value during these zero crossings of the ripple current. As a result, it is advantageous if the currents are sampled by the system controller at the beginning, middle, or end of the switching cycle.

Generally, one skilled in the art can adjust the sampling instant to occur at one of these zero crossings of the ripple current. However, several practical problems can impact the sampling instant. While it is relatively easy to adjust the sampling instant to that of the commanded switching instant, the actual switching instant is not necessarily fixed. As a result, if the actual switching instant shifts in time, the effect manifests itself as a sampling instant error. The actual switching instant is a function of the necessary inverter dead-time. The dead-time is chosen such that both switches in a phase leg will not be turned on simultaneously. As a result, the dead-time must be large enough to accommodate variability in the switching times across the entire temperature range and manufacturing tolerances of the inverter switches and gate driver circuitry. In addition, the ripple current trajectory is a function of all three inverter phases. While the current regulator can adjust for any steady-state differences resulting from the effect of the switching time on the average output voltage, the current regulator cannot adjust for relative movement between the actual switching and sampling instants.

In accordance with an exemplary embodiment of the present invention, the controller of the voltage source inverter system chooses the pulse sequence that minimizes any error that may result from the ripple current due to inexact switching times. In a particular exemplary embodiment of the present invention, the controller can choose between one of the four sequences in a given sector, as illustrated in FIG. 28. For example, if the controller utilizes a null vector of $V_0$, the controller choose between the $V_0$ CNV sequence and the $V_0$ CAV sequence. Similarly, if the null vector is $V_7$, the controller chooses between $V_7$ CNV sequence and the $V_7$ CAV sequence. This choice is based on the sector, the commanded modulation index, and the angle of the voltage vector to minimize the errors in the sampling instant resulting from the ripple current.

As noted above and as represented in FIG. 29, the ripple current is at zero during the beginning, middle, and end of the switching period. In accordance with a further particular exemplary embodiment of the present invention, the pulse sequence is chosen such that the sampling instant occurs at the beginning of the switching period and at a point farthest from the switching instant. It is believed that maximizing the time between the sampling instant and the switching instant can provide the most accurate sampling of the current for at least two reasons. First, the slope of the current variation is at a minimum for the cycle where the slope of the ripple is lowest. Thus, the current at this point is closer to its average value over a wider time range, which minimizes any error that results from the inexact sampling instants. Second, the actual switching events may induce high frequency noise in the system or measuring circuit. As such, the switching instant should not occur close to the switching instant.

The duty cycles of the active and null vectors are determined by the controller to choose the proper pulse sequence. The duty cycles of the three space vectors employed over any PWM switching period can be determined from the space vector diagram, such as that shown in FIG. 3. FIG. 30 illustrates the determination of the duty cycles when the commanded output voltage vector $v^*_{dq}$ is in sector one. Using the space vector diagram as a reference, the duty cycles of the two active space vectors and the zero voltage vector can be found from Equations (1), (2), and (3), as follows:

$$d_1 = \frac{2\sqrt{3}}{\pi} M_i^* \sin\left(\frac{\pi}{3} - \theta\right) \quad (1)$$

$$d_2 = \frac{2\sqrt{3}}{\pi} M_i^* \sin(\theta) \quad (2)$$

$$d_3 = 1 - d_3 - d_2 \quad (3)$$

In Equations (1) and (2), $M^*_i$ is the commanded modulation index of the output voltage and $\theta$ is the angular position of the output voltage vectors. In general, the modulation index defines the amplitude of the fundamental output voltage component produced by the three phase voltage source inverter.

Once the duty cycles of the active and null voltage vectors are determined from Equations (1)-(3), one of the pulse sequences illustrated for example in FIG. 28 can be implemented by the system controller, and $d_2$ indicating the duty cycle of the zero vector (either $V_0$ and $V_7$) and $d_1$ and $d_2$ indicating the duty cycles of the two active vectors. Equations (1)-(3) also yield the duty cycles corresponding to sectors two-six after accounting for the change in angle $\theta$ and the active vectors for a given sector. Generally, $d_2$ refers to the duty cycle following the $d_1$ duty cycle in a counter-clockwise direction of the space vector diagram.

Figure 31:
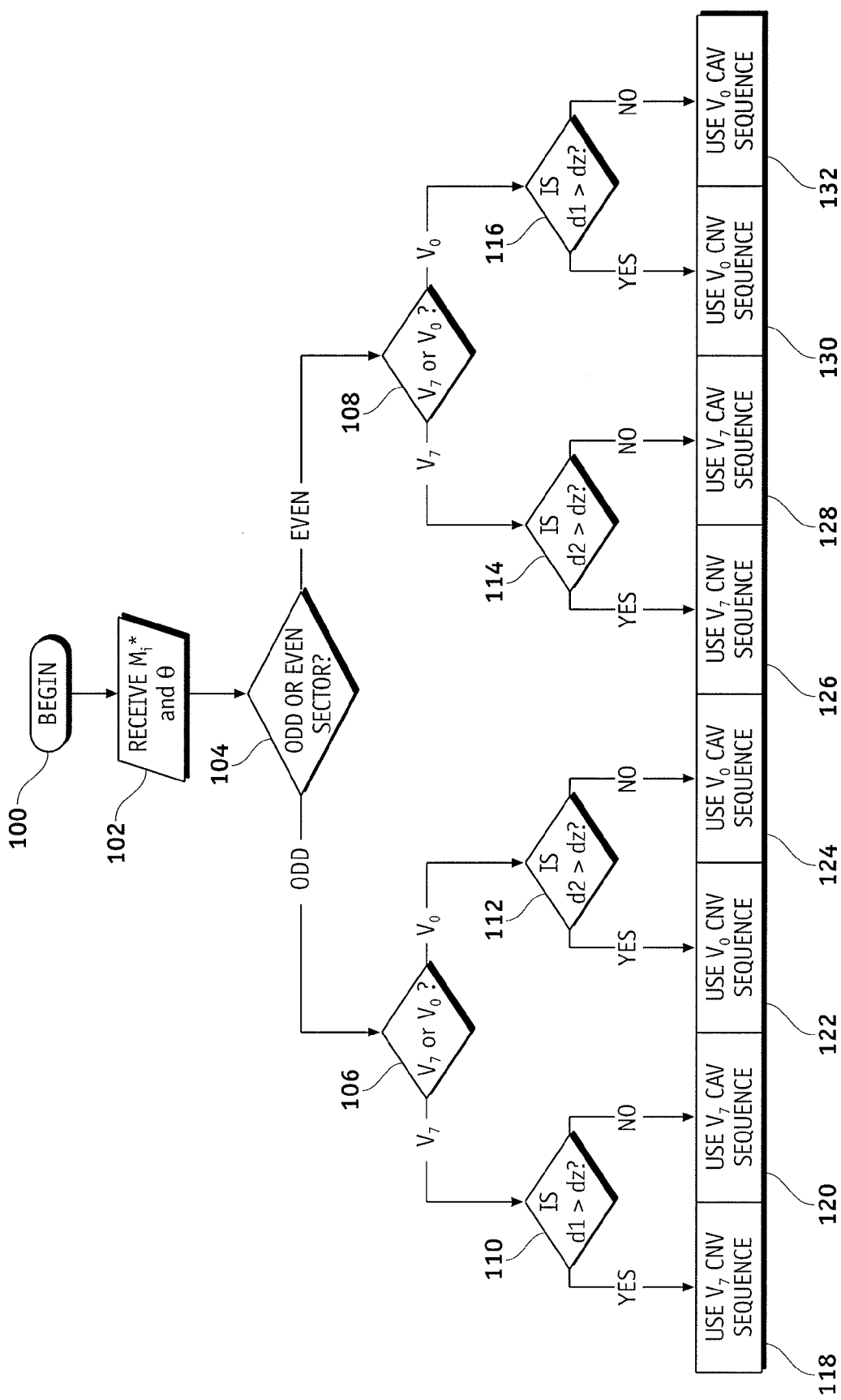
FIG. 31 is a flowchart illustrating the process of choosing the pulse sequence for a voltage source inverter system in accordance with an exemplary embodiment of the present invention.

FIG. 31 is a flowchart detailing the process in the controller for choosing the pulse sequences based on the duty cycles for any PWM switching period. In particular, FIG. 31 details the process for determining the appropriate pulse sequence that results in the sampling instant occurring at the beginning of the switching cycle.

The process begins in step 100. In step 102, the commanded modulation index and the angular position of the output voltage vector are provided. In step 104, the controller determines whether the sector is odd or even. If the sector in step 104 is odd, the controller proceeds to step 106. In step 106, the controller determines whether null vector is $V_0$ or $V_7$. If the controller determines that the null vector is $V_7$ in step 106, the controller proceeds to step 110. In step 110, the controller determines whether $d_1$ is greater than $d_z$. If $d_1$ is greater than $d_z$ in step 110, the controller proceeds to the step 118, in which the sequence is determined to be the $V_7$ CNV vector sequence. If $d_1$ is not greater $d_z$ in step 110, the controller proceeds to step 120, in which the sequence is determined to be the $V_7$ CAV vector sequence.

Referring again to step 106, if the controller determines that the null vector is $V_0$, the controller proceeds to step 112. In step 112, the controller determines whether $d_2$ is greater than $d_z$. If $d_2$ is greater than $d_z$ in step 112, the controller proceeds to step 122, in which the sequence is determined to be the $V_0$ CNV vector sequence. If $d_2$ is not greater than $d_z$ in step 112, the controller proceeds to step 124, in which the sequence is determined to be the $V_0$ CAV vector sequence.

Referring again to step 104, if the sector is even, the controller proceeds to step 108. In step 108, the controller determines whether null vector is $V_0$ or $V_7$. If the controller determines that the null vector is $V_7$ in step 108, the controller proceeds to step 114. In step 114, the controller determines whether $d_2$ is greater than $d_z$. If $d_2$ is greater than $d_z$ in step 114, the controller proceeds to step 126, in which the sequence is determined to be the $V_7$ CNV vector sequence. If $d_2$ is not greater $d_z$ in step 114, the controller proceeds to step 128, in which the sequence is determined to be the $V_7$ CAV vector sequence.

Referring again to step 108, if the controller determines that the null vector is $V_0$, the controller proceeds to step 116. In step 116, the controller determines whether $d_1$ is greater than $d_z$. If $d_1$ is greater than $d_z$ in the step 116, the controller proceeds to step 130, in which the sequence is determined to be the $V_0$ CNV vector sequence. If $d_1$ is not greater than $d_z$ in step 116, the controller proceeds to step 132, in which the sequence is determined to be the $V_0$ CAV vector sequence.

As one example of the process in the flowchart of FIG. 31, if one assumes that the sector is given as sector one and the null vector is $V_0$, the controller will calculate the duty cycles $d_1$, $d_2$, and $d_z$ based on the commanded modulation index and the angle of the voltage vector provided in step 105. The process will proceed from step 104 to step 106 because sector one is odd. In step 106, the process will proceed to step 112 because the null vector is $V_0$. If $d_2$ is greater than $d_1$, then the chosen sequence will be the $V_0$ CNV sequence, for example the $V_0$ CNV sequence shown in FIG. 6. If $d_2$ is not greater than $d_1$, the chosen sequence will be the $V_0$ CAV sequence, for example the $V_0$ CAV sequence shown in FIG. 4.

In an exemplary embodiment of the present invention, the pulse sequence that results in minimized sampling errors is chosen every switching cycle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling an alternating current (AC) motor, comprising:
    choosing a pulse sequence based on a ripple current in the AC motor at a sampling instant, the choosing step further including choosing the pulse sequence as a function of a commanded modulation index and an output voltage vector angle; and
    providing a voltage to the AC motor based on the pulse sequence.

2. The method according to claim 1, wherein the choosing step includes choosing the pulse sequence such that the ripple current is minimized at the sampling instant.

3. The method according to claim 2, wherein the sampling instant is at the beginning of the pulse sequence.

4. The method according to claim 1, wherein the choosing step includes choosing the pulse sequence for each of a plurality of switching cycles.

5. The method according to claim 1, wherein the providing step comprises driving the AC motor with an inverter.

6. The method according to claim 5, wherein the providing step comprises driving the inverter with a discontinuous pulse width modulation (DPWM) signal.

7. The method according to claim 5, wherein the pulse sequence has a common pulse vector at the beginning and the end of the pulse sequence.

8. The method according to claim 5, wherein the inverter includes a circuit comprising first, second and third pairs of series connected switches, wherein the first, second and third pairs of switches are connected in parallel to one another with respect to a power source, and wherein the pulse sequence results in at least one switch not being switched during the pulse sequence.

9. The method according to claim 5, wherein the inverter includes a circuit comprising first, second and third pairs of series connected switches, wherein the first, second and third pairs of switches are connected in parallel to one another with respect to a power source, and wherein the pulse sequence results in no more than one switch being switched at a time.

10. The method according to claim 1, wherein the choosing step further comprises choosing one of a center active vector pulse sequence and a center null vector pulse sequence.

11. A voltage source inverter system for controlling an AC motor, the voltage source inverter system comprising:
    a controller having an input and an output; and
    a switch network having an input coupled to said output of said controller and having an output configured to couple to the AC motor,
    wherein the controller is configured to provide a signal to the switch network that produces a pulse sequence to the AC motor, and
    wherein the controller is configured to choose the pulse sequence based on a ripple current in the AC motor at a sampling instant and as a function of a commanded modulation index and an output voltage vector angle.

12. The system according to claim 11, wherein the controller is configured to choose the pulse sequence such that the ripple current is minimized at the sampling instant.

13. The system according to claim 12, wherein the sampling instant is at the beginning of the pulse sequence.

14. The system according to claim 11, wherein the controller is configured to choose the pulse sequence for each of a plurality of switching cycles.

15. The system according to claim 11, wherein the switch network is an inverter.

16. The system according to claim 11, wherein the signal is a discontinuous pulse width modulation (DPWM) signal.

17. The system according to claim 11, wherein the pulse sequence has a common pulse vector at the beginning and the end of the pulse sequence.

18. The system according to claim 15, wherein the inverter includes a circuit comprising first, second and third pairs of series connected switches, wherein the first, second and third pairs of switches are connected in parallel to one another with respect to a power source, and wherein the pulse sequence results in at least one switch not being switched during the pulse sequence.

19. The system according to claim 15, wherein the inverter includes a circuit comprising first, second and third pairs of series connected switches, wherein the first, second and third pairs of switches are connected in parallel to one another with respect to a power source, and wherein the pulse sequence results in no more than one switch being switched at a time.

20. The system according to claim 11, wherein the controller chooses one of a center active vector pulse sequence and a center null vector pulse sequence.

* * * * *